United States Patent … US 11,506,841 B2
Ramachandran et al. (45) Date of Patent: Nov. 22, 2022

(54) OPTICAL FIBER SYSTEM EMPLOYING TOPOLOGICAL GUIDANCE OF LIGHT

(71) Applicant: Trustees of Boston University, Boston, MA (US)

(72) Inventors: Siddharth Ramachandran, Boston, MA (US); Zelin Ma, Boston, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 17/315,314

(22) Filed: May 9, 2021

(65) Prior Publication Data

US 2022/0011512 A1 Jan. 13, 2022

Related U.S. Application Data

(60) Provisional application No. 63/022,716, filed on May 11, 2020.

(51) Int. Cl.
G02B 6/26 (2006.01)
G02B 6/42 (2006.01)
G02B 6/32 (2006.01)
G02B 6/34 (2006.01)
G02B 6/02 (2006.01)
G02B 6/14 (2006.01)

(52) U.S. Cl.
CPC ...................... G02B 6/14 (2013.01)

(58) Field of Classification Search
CPC ............... G02B 6/14; G02B 6/03611
USPC ............... 385/28, 31, 37, 124, 126
See application file for complete search history.

(56) References Cited

U.S. PATENT DOCUMENTS

| 6,614,974 B2 * | 9/2003 | Elrefaie ............ G02B 6/02328 385/124 |
| 2002/0146226 A1 | 10/2002 | Davis et al. |
| 2007/0104434 A1 | 5/2007 | Ramachandran |
| 2008/0056654 A1 | 3/2008 | Bickham et al. |

(Continued)

OTHER PUBLICATIONS

Ryf, et al.; "Mode-Division Multiplexing Over 96 Km of Few-Mode Fiber Using Coherent 6X6 MIMO Processing," Journal of Lightwave Technology, vol. 30, No. 4, Feb. 15, 2012, pp. 521-531, total pp. 11.

(Continued)

Primary Examiner — Kaveh C Kianni
Assistant Examiner — Hung Q Lam
(74) Attorney, Agent, or Firm — BainwoodHuang

(57) ABSTRACT

An optical fiber system exploits a principle of topological confinement for guided higher-order modes, in contrast to more conventional total-internal-reflection (TIR) confinement. The optical fiber has a geometry and index profile defining a cutoff wavelength for a predetermined L-mode of optical signal propagation in the optical fiber, where L is azimuthal mode index. An optical source subsystem is coupled to the optical fiber to establish an optical signal propagating in the optical fiber, wherein the optical signal has the predetermined L-mode and a wavelength being either (1) at least 15% above the cutoff wavelength such that the optical beam propagates as a topologically confined mode, or (2) sufficiently above the cutoff wavelength that, based on the L-mode of the optical beam, the optical beam propagates as a topologically confined mode having propagation loss less than 3 dB/meter.

23 Claims, 16 Drawing Sheets

(56) References Cited

U.S. PATENT DOCUMENTS

| | | | |
|---|---|---|---|
| 2015/0168643 | A1 | 6/2015 | Gruner-Nielsen et al. |
| 2015/0309250 | A1* | 10/2015 | Bickham ................. G02B 6/42 385/124 |
| 2016/0127073 | A1 | 5/2016 | Ashrafi et al. |
| 2019/0222309 | A1* | 7/2019 | Gross ................... H04B 10/073 |
| 2019/0290100 | A1* | 9/2019 | Ramachandran .. G02B 21/0032 |

OTHER PUBLICATIONS

Bozinovic, et al.; "Terabit-Scale Orbital Angular Momentum Mode Division Multiplexing in Fibers," www.sciencemag.org, vol. 340, Jun. 28, 2013, pp. 1545-1549, total pp. 5.
Sasaki, et al.; "Single-Mode 37-Core Fiber With a Cladding Diameter of 248 UM," Th1H2.pdf, Opticle Society of America 2017, downloaded May 21, 2021, UTC from IEEE Xplore, total pp. 3.
Wang, et al.; "Linearly Polarized Vector Modes: Enabling MIMO-Free Mode-Division Multiplexing," vol. 25, No. 10, May 15, 2017, Optics Express, pp. 11736-11748, total pp. 13.
Gregg, et al.; "Conservation of Orbital Angular Momentum in Air-Core Optical Fibers," vol. 2, No. 3, Mar. 2015, Optica, Optical Society of America, pp. 267-270, total pp. 4.
Gregg, et al.; "Enhanced Spin Orbit Interaction of Light in Highly Confining Optical Fibers for Mode Division Multiplexing," Nature Communications, (2019)10 4707, https://doi.org/10.1038/s41467-019-12401-4, www.nature.com/naturecommunications, pp. 1-8, total pp. 8.
Ma, et al.; "Light Guidance Beyond Cutoff in Optical Fibers," SF1P.2.pdf, CLEO 2020 © OSA 2020, Optical Society of America, total pp. 2.
Bozinovic, et al.; "Control of Orbital Angular Momentum of Light With Optical Fibers," Jul. 1, 2012, vol. 37, No. 13, Optics Letters, pp. 2451-2453, total pp. 3.
Cozzolino, et al.; "Orbital Angular Momentum States Enabling Fiber-Based High-Dimensional Quantum Communication," Published by the American Physical Society, Physical Review Applied 11, 064058 (2019), pp. 064058-1 to 064058-12, total pp. 12.
Demas, et al.; "Intermodal Nonlinear Mixing With Bessel Beams in Optical Fiber," vol. 2, No. 1, Jan. 2015, Optica, Optical Society of America, pp. 14-17, total pp. 4.
Cizmar, et al.; "Exploiting Multimode Waveguides for Pure Fibre-Based Imaging," Nature Communications, (2012)3:1027, DOI: 10.1038/ncomms2024 | www.nature.com/naturecommunications, total pp. 9.
Berenger; "A Perfectly Matched Layer for the Absorption of Electromagnetic Waves," Journal of Computational Physics 114 (1994), pp. 185-200, total pp. 16.
Stegall, et al.; "Leaky Cladding Mode Propagation in Long-Period Fiber Grating Devices," IEEE Photonics Technology Letters, vol. 11, No. 3, Mar. 1999, pp. 343-345, total pp. 3.
Nicholson, et al.; "Spatially and Spectrally Resolved Imaging of Modal Content in Large-Mode-Area Fibers," May 12, 2008, vol. 16, No. 10, Optices Express, pp. 7233-7243, total pp. 11.

Sammut, et al.; "Leaky Modes on Circular Optical Waveguides," Applied Optics, vol. 15, No. 2, Feb. 1976, pp. 477-482, total pp. 6.
Bucksbaum, et al.; "Suppression of Multiphoton Ionization With Circularly Polarized Coherent Light," Physcial Review Letters, vol. 56, No. 24, Jun. 16, 1986, The American Physical Society, pp. 2590-2593, total pp. 4.
Pedersen, et al.; "Impact of the Scalar Approximation on the Prediction of the Group Velocity Dispersion," Journal of Lightwave Technology, vol. 29, No. 21, Nov. 1, 2011, pp. 3129-3134, total pp. 6.
Ramachandran, et al.; "Generation and Propagation of Radially Polarized Beams in Optical Fibers," Optics Letters, vol. 34, No. 16, Aug. 15, 2009, pp. 2525-2527, total pp. 3.
Ramachandran, et al.; "Lifting Ploarization Degeneracy of Modes by Fiber Design: A Platform for Polarization-Insensitive Microbend Fiber Gratings," Optics Letters, vol. 30, No. 21, Nov. 1, 2005, pp. 2864-2866, total pp. 3.
Johnson, et al.; "Measurement of the Spin-Orbit Coupling Interaction in Ring-Core Optical Fibers," OSA Continuum, vol. 2, No. 10, Oct. 15, 2019, pp. 2976-2983, total pp. 8.
Abedin, et al.; "Reconversion of Higher-Order-Mode (HOM) Output From Cladding-Pumped Hybrid YB: HOM Fiber Amplifier," Optics Express, vol. 27, No. 6, Mar. 18, 2019, pp. 8585-8595, total pp. 11.
Renninger, et al.; "Optical Solitons in Graded-Index Multimode Fibres," Natures Communications, Published Apr. 16, 2013, 4:1719, DOI: 10.1038/ncomms2739, www.nature.com/naturecommunications, pp. 1-6, total pp. 6.
Krupa, et al.; "Spatial Beam Self-Cleaning in Multimode Fibres," Nature Photonics, Published online: Mar. 13, 2017, DOI: 10.1038/NPHOTON.2017.32, vol. 11, Apr. 2017, www.nature.com/naturephotonics, pp. 237-242, total pp. 6.
Gloge, "Weakly Guiding Fibers," Applied Optics, vol. 10, No. 10, Oct. 1971, pp. 2252-2258, total pp. 7.
Ung, et al.; "Few-Mode Fiber With Inverse-Parabolic Graded-Index for Transmission of OAM-Carrying Modes," Optics Express, vol. 22, No. 15, Jul. 28, 2014, OE.22.018044, pp. 18044-18055, total pp. 12.
Zhu, et al.; "Scalable Mode Division Multiplexed Transmission Over a 10-KM Ring-Core Fiber Using High-Order Orbital Angular Momentum Modes," Optics Express, vol. 26, No. 2, Jan. 22, 2018, pp. 594-604, total pp. 11.
Ryf, et al.; "High-Spectral-Efficiency Mode-Multiplexed Transmission Over Graded-Index Multimode Fiber," Downloaded on Jul. 9, 2021 at 21:29:17 UTC from IEEE Xplore, total pp. 3.
Liu, et al.; "Nonlinear Four-Wave Mixing With Enhanced Diversity and Selectively Via Spin and Orbital Angular Momentum Conservation," APL Photonics 5, 010802 (2020), https://doi.org/10.1063/1.05130715, total pp. 9.
Greenberg, et al.; "Single-Shot, Sub-Picometer-Resolution Wavemeter Using Topologically Enhanced Optical Activity of OAM Fiber Modes," JTh5A.9.pdf, CLEO 2019, OSA 2019, total pp. 2.
Knoop, et al.; "Metastable Feshback Molecules in High Retational States," Physical Review Letters, Feb. 29, 2008, PRL 100, 083002, The American Physical Society, pp. 1-4, total pp. 4.

\* cited by examiner

OPTICAL FIBER SYSTEM EMPLOYING TOPOLOGICAL GUIDANCE OF LIGHT

STATEMENT OF GOVERNMENT RIGHTS

This invention was made with Government support under Grant No. DE-SC0012704 awarded by the Department of Energy, Grant No. ECCS-1610190 awarded by the National Science Foundation, and Grant Nos. N00014-19-1-2632, N00014-20-1-2226 and N00014-20-1-2450 awarded by the Department of the Navy. The Government has certain rights in the invention.

BACKGROUND

The invention is related to the field of systems employing optical fibers, including optical communications, optical lasers, and non-linear optical devices for example.

SUMMARY

An optical fiber system is disclosed that exploits a principle of topological confinement for guided higher-order modes, in contrast to more conventional total-internal-reflection (TIR) confinement. The optical fiber has a geometry and index profile defining a cutoff wavelength for a predetermined L-mode of optical signal propagation in the optical fiber, where L is azimuthal mode index. An optical source subsystem is coupled to the optical fiber to establish an optical signal propagating in the optical fiber, wherein the optical signal has the predetermined L-mode and a wavelength being either (1) at least 15% above the cutoff wavelength such that the optical beam propagates as a topologically confined mode, or (2) sufficiently above the cutoff wavelength that, based on the L-mode of the optical beam, the optical beam propagates as a topologically confined mode having propagation loss less than 3 dB/meter.

One particular use of the disclosed technique is in systems such as multiplexed communications that can use distinct modes as corresponding channels. The disclosed technique can be used in a manner to exploit a feature termed "frustrated coupling" to reduce cross-channel coupling and distortion. In these systems, the optical source subsystem is configured to generate a plurality of optical beams having corresponding (L, m) modes at corresponding beam wavelengths and direct the optical beams into the optical fiber to propagate as topologically confined modes, where m is radial mode index. The beam wavelengths and L values of the (L, m) modes are selected to result in frustrated coupling between the (L, m) modes and the other-m modes, with correspondingly low mode-mixing distortion.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Brief Overview

Systems and apparatus are disclosed in which light is guided in higher azimuthal order (L) modes with negligible loss over 10s of meters to km lengths of fiber at wavelengths 100 to 200 nm past their cutoff wavelengths (the wavelength at which no light guidance is conventionally assumed to be possible). The attenuation of cutoff modes decreases dramatically with mode order L. This topological protection effect points to exciting new approaches for the fiber design of device and short-haul communications length applications, both for achieving desired nonlinear and dispersive properties, as well as for scaling mode count for applications such as multiplexed communications or increasing the security or dimensionality of quantum links.

1. Topological Confinement and TCMs

Background—TIR in Planar Waveguide

Convention waveguiding is based on total internal reflection (TIR) as well-known knowledge. The incident angle needs to be smaller than the TIR critical angle for the light to be bound and guided, otherwise the light would leak out. Instead of the analysis of the incident angle, the waveguiding can be understood easier with the help of k-vector and effective index.

Figure 1:
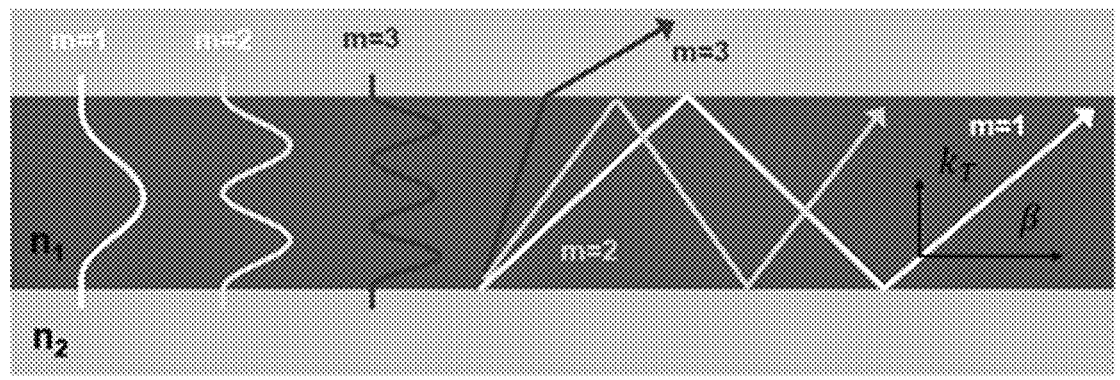
FIG. 1 is a schematic illustration of guided and unguided modes in a planar waveguide.

FIG. 1 provides an example illustration for a simple planar waveguide (containing two dimensions in transverse and longitudinal directions). The refractive index in the core and cladding are $n_1$ and $n_2$, respectively, where $n_2<n_1$. The wave vector of light in the core $n_1 k_0$ can be decomposed into a longitudinal component (known as the propagation constant $\beta$) and a transverse component $k_T$. Usually, can be written in terms of effective index $n_{eff}$. The transverse k-vector $k_T$ needs to satisfy the standing wave condition for guidance, and such a stable state corresponds to a certain mode associated with a certain index m. TIR condition requires $\beta$ to be larger than the k-vector in the cladding for the light to be guided inside the core:

$$\beta^2 = (k_0 n_1)^2 - k_T^2 > (k_0 n_2)^2,$$

where $$k_0 = \frac{2\pi}{\lambda}, \beta = k_0 n_{eff}$$

where $\lambda$ is the free-space wavelength of the light.

As shown in FIG. 1, from mode with m=1 to m=3, the k-vector becomes more and more transversely oriented (the value of $k_T$ gets larger and $\beta$ becomes smaller correspondingly). The index m basically indicates the number of transverse oscillation cycles in the core, as shown in the intensity profiles on the left side of FIG. 1. For m=3 in this waveguide, $\beta$ is decreased so much that the guiding condition is no longer satisfied, thus this mode is cutoff, or unguided. In other words, higher m leads to higher $k_T$, resulting in the light to escape from the waveguide. Apart from that, $\beta$ can also be decreased to cutoff by increasing the wavelength to a certain point, which is called the cutoff wavelength. Usually, loss starts to rise even in the guiding region at wavelengths close to the cutoff wavelength. From the perspective of effective index, the guiding condition requires $n_{eff}$ to be larger than index in the cladding. For example, for the three modes in FIG. 1, we have $n_{eff,3} < n_2 < n_{eff,2} < n_{eff,1} < n_1$.

Skew Rays, Mode Indices and TCM

Figure 2:
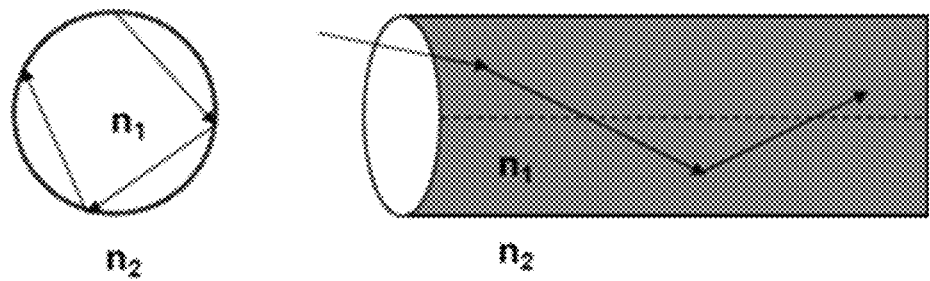
FIG. 2 is a schematic illustration of skew rays in a fiber.

FIG. 2 is an illustration of light propagation in an optical fiber, which has both azimuthal and radial directions in the transverse plane. Thus, guidance can be very different compared with a planar waveguide, specifically for skew rays which never cross the fiber axis, as illustrated in FIG. 2. These rays correspond to fiber modes with non-zero azimuthal index L. These modes can be represented in multiple mathematically equivalent bases, and are variously classified as $LP_{L,m}$, $HE_{L+1,m}$, $EH_{L-1,m}$ or $OAM_{L,m}$ modes, where OAM stands for orbital angular momentum. Here, the index L has already been defined as the index that corresponds to phase or amplitude repetitions of the electric field profile of the mode in the azimuthal direction $\varphi$ with respect to the cross-section of the fiber. And, m is the index in the radial direction, signifying the number of intensity maxima a mode possesses in said direction. The details of these mode designations are well known for those skilled in the art, and are described in Z. Ma and S. Ramachandran, "*Propagation stability in optical fibers: role of path memory and angular momentum,*" Nanophotonics 10, 209 (2021), incorporated by reference in its entirety.

The transverse k-vector $k_T$ in skew rays are not pointed only in the radial direction, but they can be decomposed into azimuthal and radial k-vectors, $k_\varphi$ and $k_r$. The components exhibit respective mode orders with indices L, m respectively.

Figure 3:
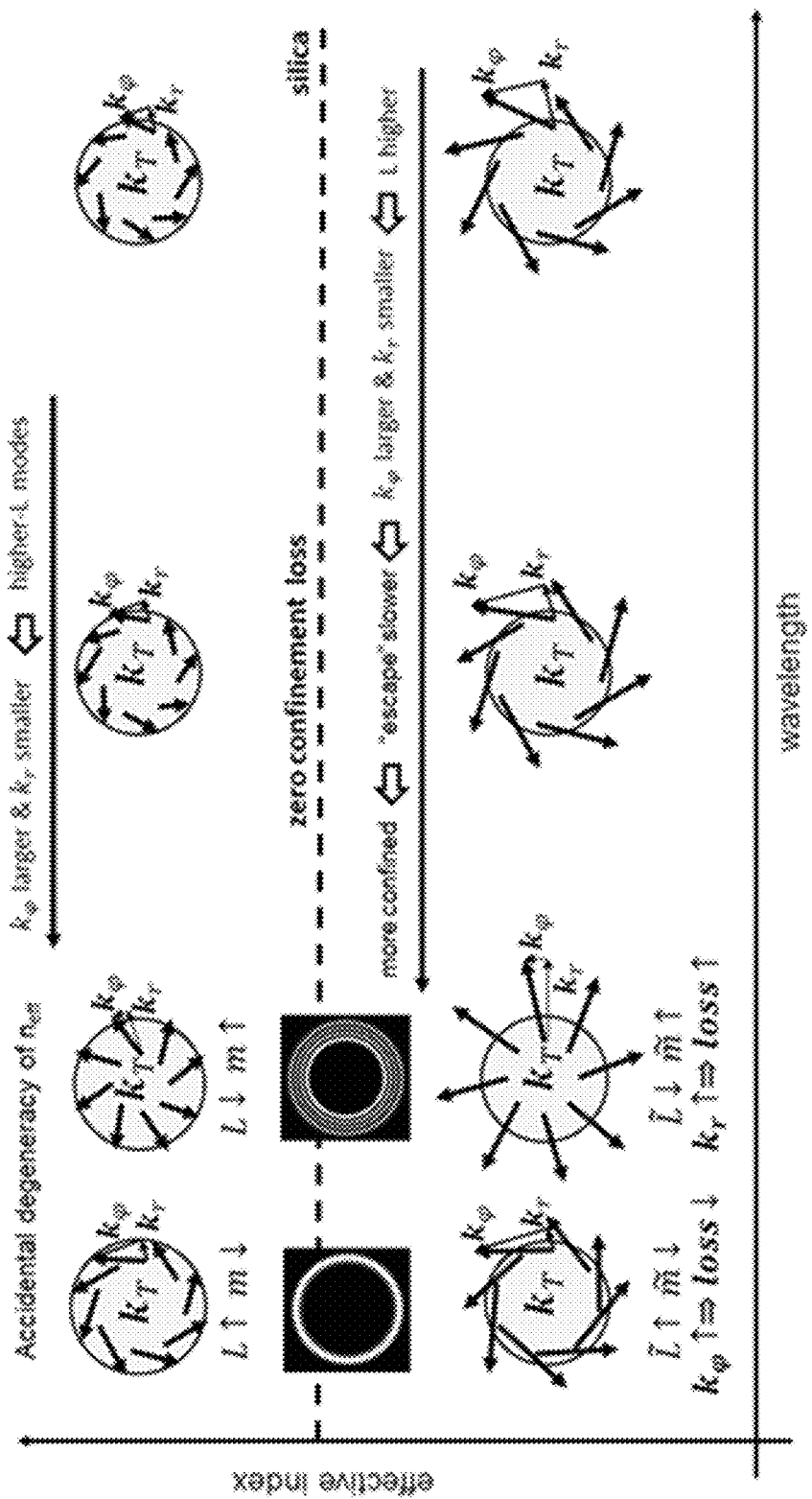
FIG. 3 is a schematic of transverse k-vector $k_T$ distribution for representative modes.

FIG. 3 shows a schematic of $k_T$ distribution for some representative modes. The modes with effective indices above the silica line are conventional guided modes, satisfying the TIR condition. At the same $n_{eff}$ level, higher-L modes show up at shorter wavelengths, and they have larger $k_\varphi$ and smaller $k_r$. In a typical application m=1 modes are desired, while higher-m modes (with lower L) can be accidentally degenerate with the desired m=1 modes, leading to undesired mode mixing and distortion. Two representative mode images of m=1 and m=4 are shown below the k-vector schematic of low-m and high-m modes. Conventionally, modes with effective index below silica are considered as unbound and unguided, but in fact such modes can actually still be guided even though they are only quasi-bound (with loss that is low enough for the modes to be guided). This effect can be enhanced (loss becomes lower) dramatically for higher-L modes. Because such confinement (guiding) is enabled by the topological charge of light, it is referred to herein as "topological confinement," and such modes are referred to as "topologically confined modes" (TCMs). Unlike conventional TIR-based guidance, where bound states and guided modes are equivalent, TCMs are unbound but still guided.

This effect can be understood by considering the $k_T$ distribution of modes. Generally, higher L makes $k_T$ to be more azimuthally oriented (large $k_\varphi$), leading to higher confinement even beyond cutoff, resembling whispering gallery modes with light only slowly escaping into the cladding. In contrast, larger $k_r$ leads to higher loss, causing light to radially escape, similar to the effect of higher $k_T$ in planar waveguides. As shown in the second row of modes below the silica line in FIG. 3, higher-L modes are more confined due to large $k_\varphi$, and smaller $k_r$. In addition, at the point where the low-m mode and high-m mode are accidentally degenerate with each other, the loss of low-L and high-m TCM can be much higher than that of high-L and low-m TCM (labelled with a tilde sign "~" in FIG. 3 to distinguish them from bound modes), because higher-m modes have much larger $k_r$ (therefore much smaller $k_\varphi$, for maintaining the same overall $k_T$, and hence mode effective index).

Centrifugal Barrier

Figure 4B:
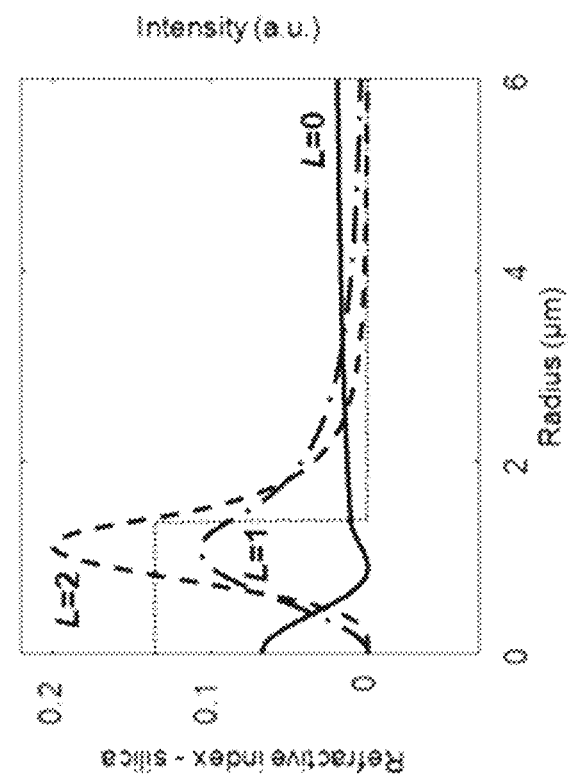
FIGS. 4A and 4B are fiber profile plots describing the concept of centrifugal barrier.
Figure 4A:
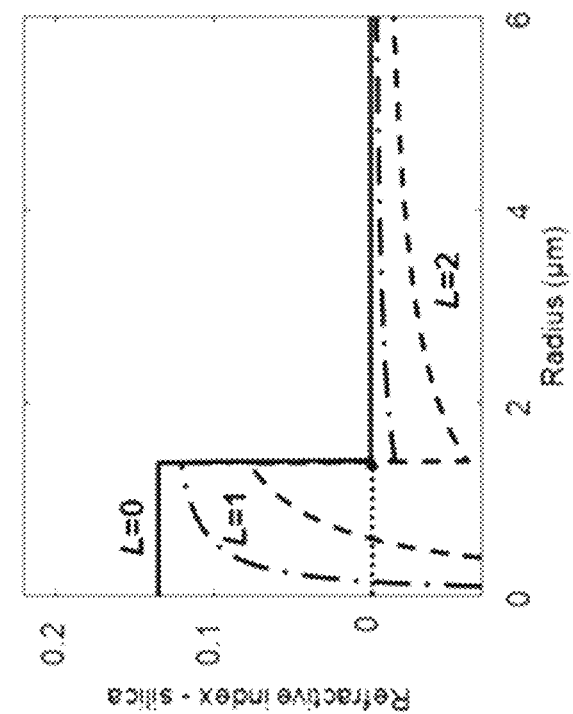

FIGS. 4A and 4B are used to describe the concept of centrifugal barriers. The scalar wave equation for the radial field E(r) can be written as $$\frac{d^2 E(r)}{dr^2} + \frac{1}{r}\frac{dE(r)}{dr} + [k_0^2 n_{AngEff}^2 - \beta^2]E(r) = 0$$

Where the angular effective index profile is $$n_{AngEff} = \sqrt{n^2 - \frac{L^2}{k_0^2 r^2}}$$

For L>0, the angular effective index profile is not step-shaped anymore; rather it comprises a trench (as an inverted barrier) depending on L. For example, in a step index fiber with $\Delta n=0.14$ and radius 1.4 um, the angular effective index profiles of L=0, L=1 and L=2 are shown in FIG. 4A. For a mode just below cutoff (modal effective index is 0.0001 smaller than the index of silica), the corresponding intensity distributions are shown FIG. 4B. For L=0, the angular effective index profile is the same as the original, and the intensity in the cladding does not converge to zero—that is, the mode is highly leaky and lossy, as expected conventionally for modes that are cut off. However, for L=1, the angular effective index becomes lower than the modal effective index at the boundary yielding a barrier that partially prevents light from escaping into the cladding. For L=2, the angular effective index is even lower, therefore the mode is even more confined. This trench of the angular effective index profile at the boundary is effectively an inverted centrifugal barrier. Note, also, from FIG. 4A, that this inverted barrier does not extend to infinite radius and only has a finite spatial extent. As such, it is not a barrier that leads to complete confinement and zero theoretical loss, as is the case for conventionally bound modes (with effective index above that of the cladding). Instead, it leads to finite loss. What FIGS. 4A and 4B illustrate in combination is that this finite loss decreases as mode index L increases—hence cutoff modes of increasing mode index L have progressively lower loss.

2. Attenuation (Loss) for Different Modes (L, m)

This section assumes a particular example fiber, namely a ring-core fiber with outer ring radius ~15 urn, referred to herein as "Gen5 A3" fiber.

Figures 5A, 5B:
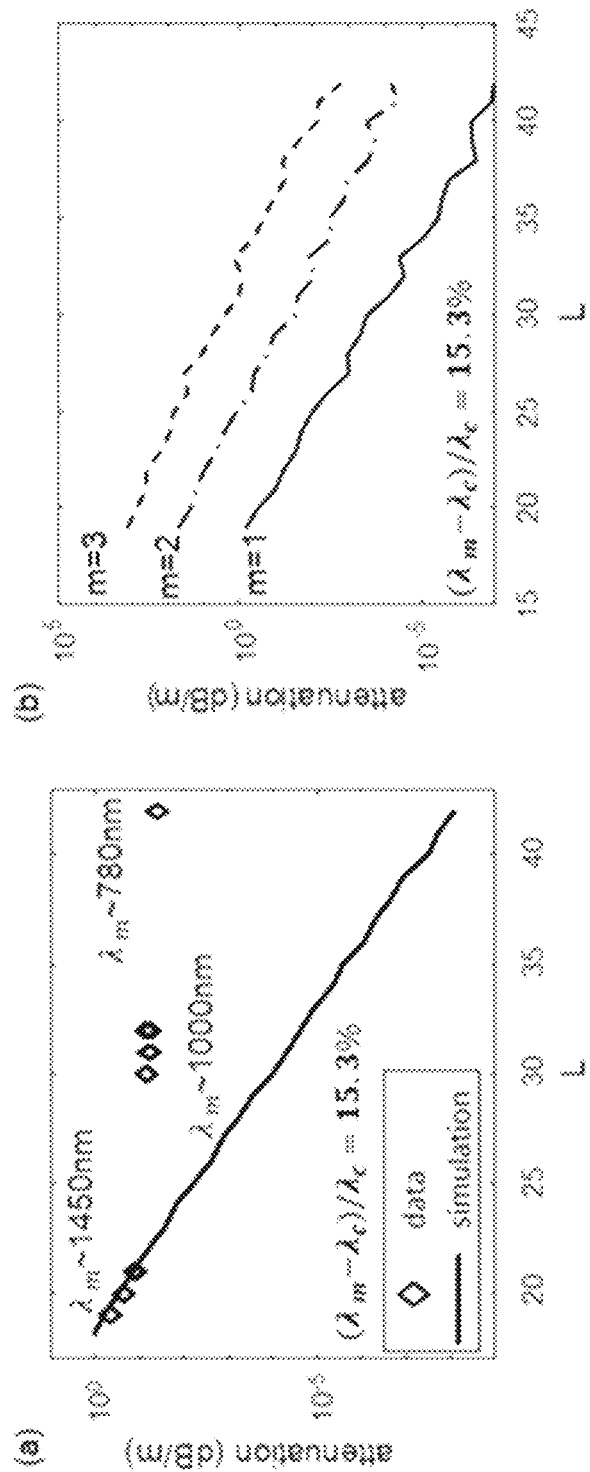
FIGS. 5A and 5B are plots of attenuation versus L for representative m-modes.

FIG. 5A shows both the experimental and simulated loss for modes with azimuthal index ranging from L=19 to 42, all with radial mode order m=1. In this example mode loss is measured at a wavelength $\lambda_m$ such that $(\lambda_m - \lambda_c)/\lambda_c = 15.27\%$, where the cutoff wavelength $\lambda_c$ for a mode is calculated as the wavelength at which its effective index is equal to the refractive index of the cladding. This ensures consistency in comparing loss at the same wavelength relative to the respective mode's cutoff wavelength. Desired modes are excited by a spatial light modulator (SLM), and the output is analyzed via spatial-interferometry, to confirm mode purities greater than 13 dB, yielding high confidence in the accuracy of the measurements. The attenuation of each mode is measured by cutback normalized for material loss (deduced by measuring cutback loss for the $LP_{01}$ mode in this fiber). This data shows that the attenuation declines rapidly as the L increases. Note that the experimental loss matches well with the simulated loss around 1450 nm, while the discrepancy is larger and larger for modes measured at lower wavelengths (~1000 nm and ~780 nm). This is likely due to strong scattering at shorter wavelength, away from telecom wavelength where the fiber was designed to operate. Nevertheless, the trend of lower loss for higher L modes is evident in theory as well as experiment.

While FIG. 5A shows characteristics for radial mode order m=1, FIG. 5B compares simulated losses for modes with radial order m=1, m=2 and m=3 at a wavelength $\lambda_m$ such that $(\lambda_m - \lambda_c)/\lambda_c = 15.27\%$. This data shows that the loss of high-m modes also drops for higher L, but crucially, higher-m modes are much lossier than m=1 modes of same L.

Figure 6:
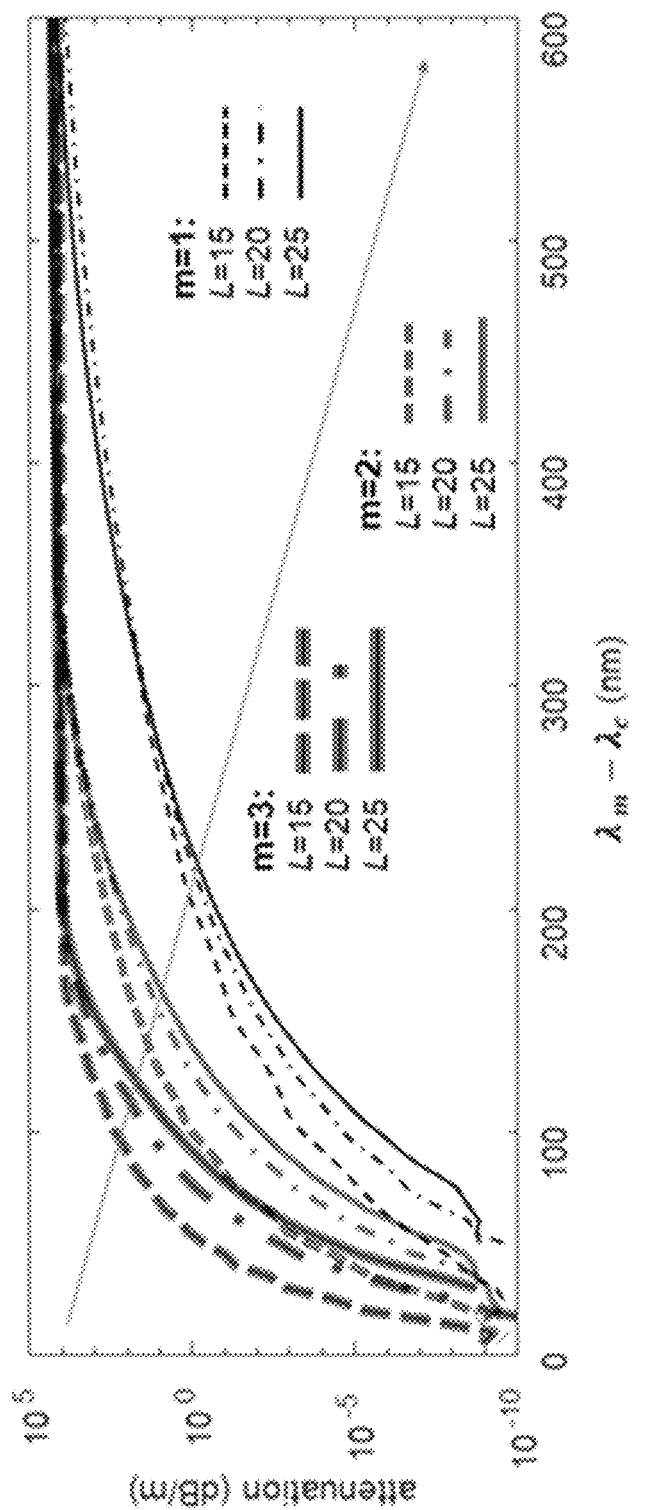
FIG. 6 is a plot of wavelength-dependent attenuation for representative modes.

FIG. 6 shows the attenuation of different modes in a different way, with respect to the wavelength away from cutoff wavelength $\lambda_c$ of each mode. Proceeding in the down-right direction indicated by the arrow, the modes are sequentially L=15, 20, 25 with m=3, L=15, 20, 25 with m=2, and L=15, 20, 25 with m=1. Each mode is plotted with respect to the wavelength away from its cutoff wavelength $\lambda_c$. This data shows that the loss is lower for higher-L and lower-m.

Such L-dependent loss points to a new rule of scaling the mode count just by enlarging the fiber size. As seen in FIG. 5A, L=42 at 780 nm (roughly half of 1550 nm) has extremely low theoretical loss even at a wavelength 15.3% away from the cutoff wavelength. By doubling the size of the fiber, we can have such high-L modes with low loss around the telecom wavelength of ~1550 nm, because, ignoring material dispersion, it is well known to those skilled in the art that modal behavior and characteristics (e.g., loss) are same for a given ratio of wavelength/fiber-size.

Figure 7:
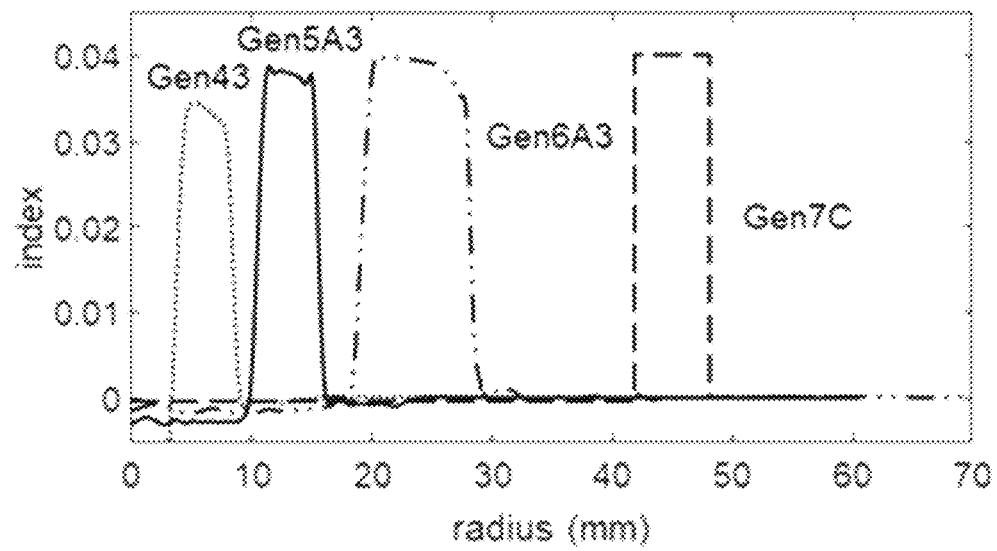
FIG. 7 is a diagram of index profiles of various optical fibers.

FIG. 7 shows the index profiles of different fibers having different sizes and therefore different cutoff modes $L_c$ (the highest L for bound modes). For these fibers, which are referred to as Gen43, Gen5 A3, Gen6 A3, Gen7C, the respective cutoff modes $L_c$ are 7, 16, 33 and 58, respectively.

Figure 8:
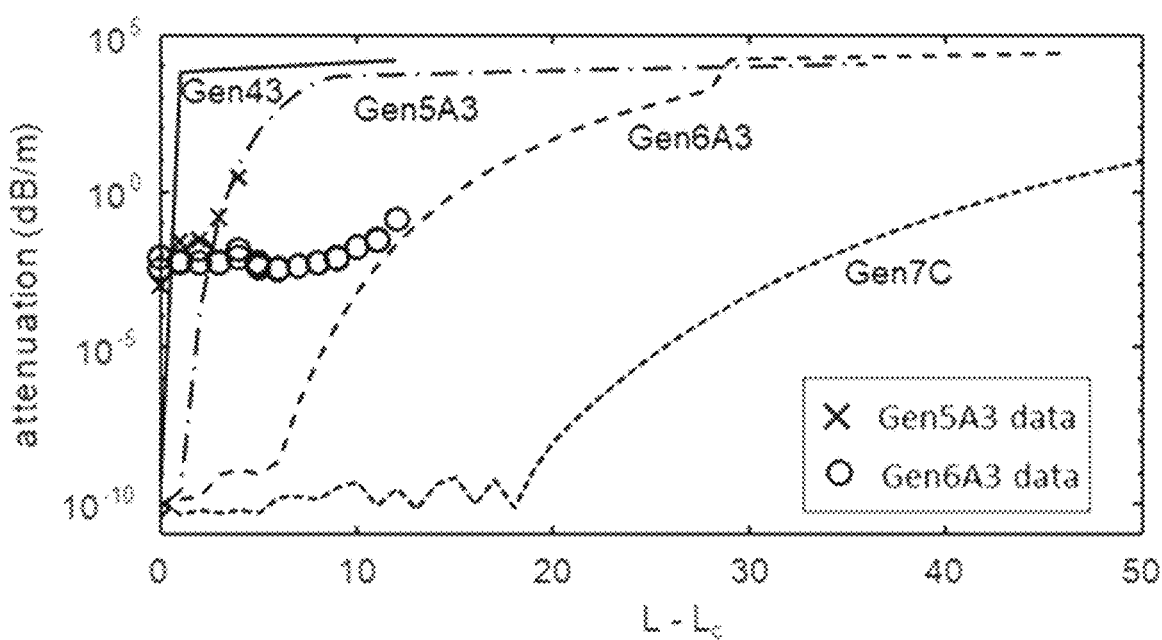
FIG. 8 shows L-dependent attenuation for the fibers of FIG. 7.

FIG. 8 shows the L-dependent loss for the fibers of FIG. 7. The cross and circle data points are experimentally measured losses at 1550 nm for Gen5 A3 and Gen6 A3, respectively. The lowest and highest limit of $10^{-10}$ dB/m and $10^5$ dB/m are the loss constraints of the simulation. Ignoring mode mixing, to be described later, the mode count, as defined by the number of modes with simulated losses below an a priori specified value, clearly increases, as shown in this figure. Note that each mode order L comprises 4 distinct spatial modes, regardless of whether the modes are expressed in the $LP_{L,m}$, $HE_{L+1,m}$, $EH_{L-1,m}$ or $OAM_{L,m}$ basis. From the perspective of loss and topological confinement behavior, these four modes either behave identically (if, e.g., expressed in the LP designation) or almost similarly (e.g., in the HE, EH or OAM designation). Hence, without loss of generality, we can describe the behavior of all these modes by illustrating the behavior of only one of them. Specifically, in the ensuing discussion and illustrations, we describe the behavior of OAM modes designated as SOa modes when the sign of L and the circular polarization are the same, and as SOaa modes when the signs of the two are opposite of one another. Note that the circular polarizations of these modes are, by convention, positive in sign for left circular polarized (LCP) light and negative in sign for right circularly polarized (RCP) light.

The loss criteria one would use to designate a mode as being useful depends on the length scale of the application of interest. For example, a loss of ~0.1 dB/m is required for meter-length fiber devices (switches, network nodes, amplifiers, lasers). For longer length scale applications in data communications (~1 km), lower loss values, such as ~1 dB/km, may be required. For even longer length scales, like metro lengths (~100 km) and long haul (~1000 km), the theoretical loss should be at least lower than the material transmission loss in single-mode fiber of around 0.15 dB/km.

Specifically, if 0.1 dB/m is set as the loss criteria then the number of such modes that are topologically confined but not conventionally known to exist, can be compared for the different fibers illustrated in FIG. 7. Gen43 does not show any extra modes in simulation or experiment; Gen5 A3 has 2×4 extra modes in simulation and experiment; Gen6 A3 is expected to have 12×4 extra modes and experimental measurements reveal that it has approximately 11×4 extra modes; and Gen7C is expected to enhance this TCM effect with even larger fiber and is expected to have 38×4 extra modes, based on simulations.

3. Frustrated Coupling

In a multi-mode application such as multi-channel telecommunications transmission, mode mixing needs to be avoided to prevent information channels from mixing. Although all modes with different L, m and polarizations are orthogonal with each other, they can couple in the presence of fiber bends and perturbations, which exist in any realistic system. Literature is replete with teachings on how to reduce this mode coupling by fiber design. Commonly known techniques include propagating in high m but L=0 modes, which works for lengths up to 10s of meters of fiber, but only when the fiber is handled rather gently. Alternatively, a class of ring-core fibers have shown to decrease coupling between SOa and SOaa modes having the same L. In yet another embodiment, elliptical core fibers are designed to alleviate mode coupling between select polarization-diverse modes. In all such designs, mode coupling is alleviated by lifting the $n_{eff}$ splitting between the relevant modes. In general, in the context of scaling mode counts for telecommunications, it is desirable to operate with a modes of different azimuthal order L but with radial order m=1, because they are generally more stable in an ensemble of modes. However, these modes may be accidentally degenerate—i.e., they may share their $n_{eff}$ with modes with m>1 (and if different or the same L) in given wavelength ranges. When this happens, strong mode coupling results, since it is well known that modes of similar or same $n_{eff}$ tend to couple in a fiber.

Such accidental degeneracy is very dependent on the specific refractive index profile of fibers and the crossing wavelength (i.e., wavelength at which modes with m=1 and m>1 share $n_{eff}$) can be very sensitive to slight changes of the index profile. A known approach to avoid such accidental degeneracy is by carefully tuning the fiber parameters (ring radius, thickness and refractive index) to move such crossing points away from the desired range of operation, commonly the so-called C-band (1530 nm~1565 nm) in telecommunications. However, this can be very hard to achieve for a lot of modes simultaneously.

As mentioned in the context of FIGS. 5 and 6, TCMs with lower-L and higher-m can have much higher loss than TCMs with higher-L and lower-m. If the difference in loss is sufficient, the coupling between the two modes can be suppressed, leading to a phenomenon referred to herein as "frustrated coupling". In practice, there can be a transition between strong mode coupling to completely frustrated coupling.

Figures 9A, 9B:
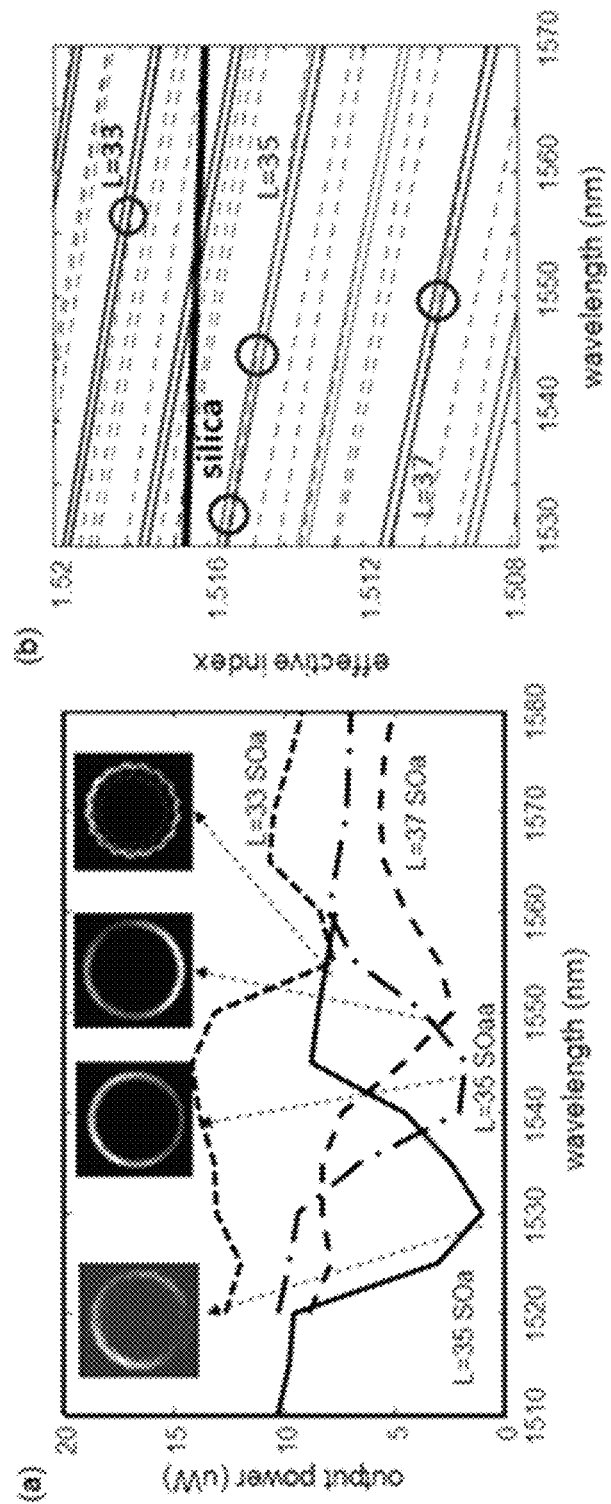
FIG. 9A is a plot of change of output power around a wavelength range of accidental degeneracy, with inserted images showing light output pattern.
FIG. 9B is a plot of neff vs. λ for select modes in the C-band of a ring-core fiber.

FIGS. 9A and 9B are used to illustrate such transitions. They are based on measurements of L=33, 35, 37, out of 500 m of Gen6 A3 fiber (FIG. 7). FIG. 9A shows the change of output power around the wavelength range of accidental degeneracy, with the inset images illustrating the light output pattern at the mode coupling wavelength. FIG. 9B shows $n_{eff}$ vs. λ for select modes in the C-band of the ring-core fiber on which transmission measurements are shown in FIG. 9A. The bold line pairs represent desired OAM modes, while the thin black dashed lines are the undesired high-m modes. The $n_{eff}$ of desired OAM modes cross a lot of undesired high-m modes, potentially leading to strong mode mixing—the circles denote the crossing wavelength for select modes whose transmission characteristics are shown in FIG. 9A.

The output of L=33 SOa not only shows the typical image distortion (resulting from inference between it and the corresponding high-m modes), but also has extra loss at the mode coupling wavelength. It is due to the high loss of corresponding high-m modes. The output of L=35 SOa also shows image distortion and extra loss at the mode coupling point, while the extra loss is much larger compared with that of L=33 SOa. The output of L=35 SOaa also has extra loss at the mode coupling wavelength, while there is no image distortion anymore. The output of L=37 SOa shows similar phenomenon as L=35 SOaa while the extra loss is lower.

An extinction ratio can be defined as the loss at the mode-crossing wavelength that is in excess of the loss that is otherwise experienced by the mode. The following table lists the extinction ratios for the modes illustrated in FIG. 9A:

| Mode | L = 33 | L = 35 SOa | L = 35 SOaa | L = 37 SOaa |
|---|---|---|---|---|
| Extinction Ratio (dB) | 19 | 9.1 | 6.7 | 4.0 |

The highest extinction ratio for L=35 SOa modes is due to reasonably high mode coupling ratio and high loss of high-m modes. Notwithstanding the limited data above, it can be assumed that the extinction ratio continues to decrease from 6.7 dB (L=35 SOaa) and 4.0 dB (L=37 SOaa) to a very small value, where such mode coupling is completely suppressed.

Figure 10:
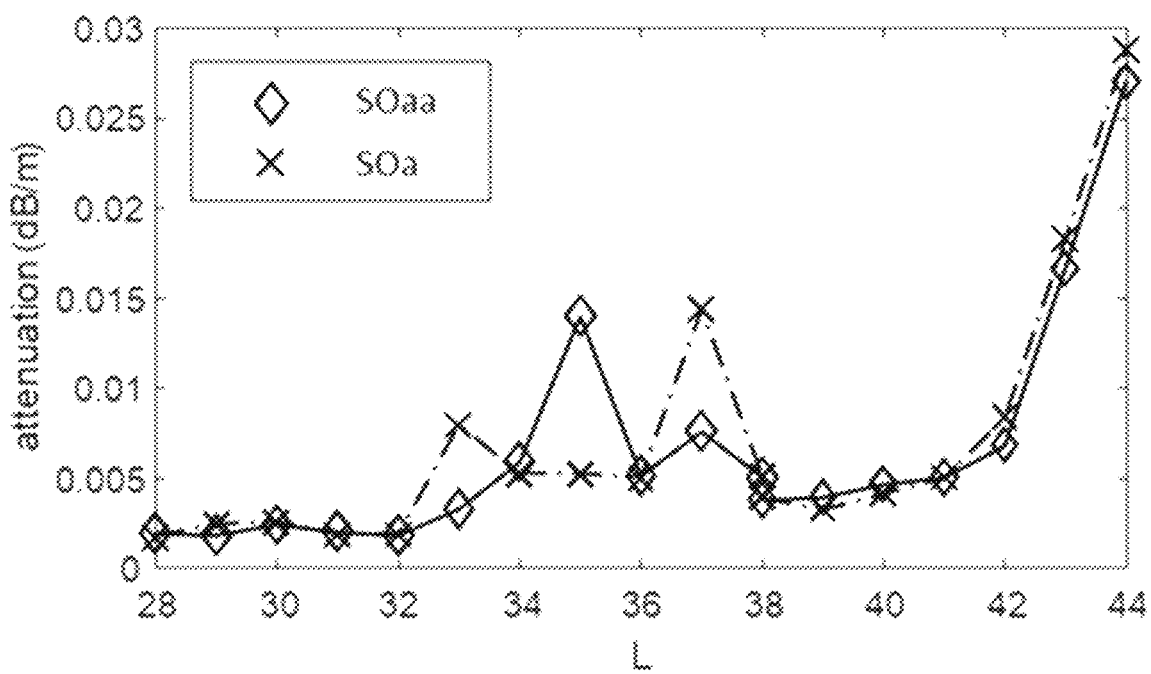
FIG. 10 shows L-dependent attenuation for a fiber.

FIG. 10 provides further illustration, showing loss measurements at 1550 nm for 500 m of Gen6 A3 fiber, L=33, L=35 and L=37 shows extra loss compared with neighboring modes.

Figure 11:
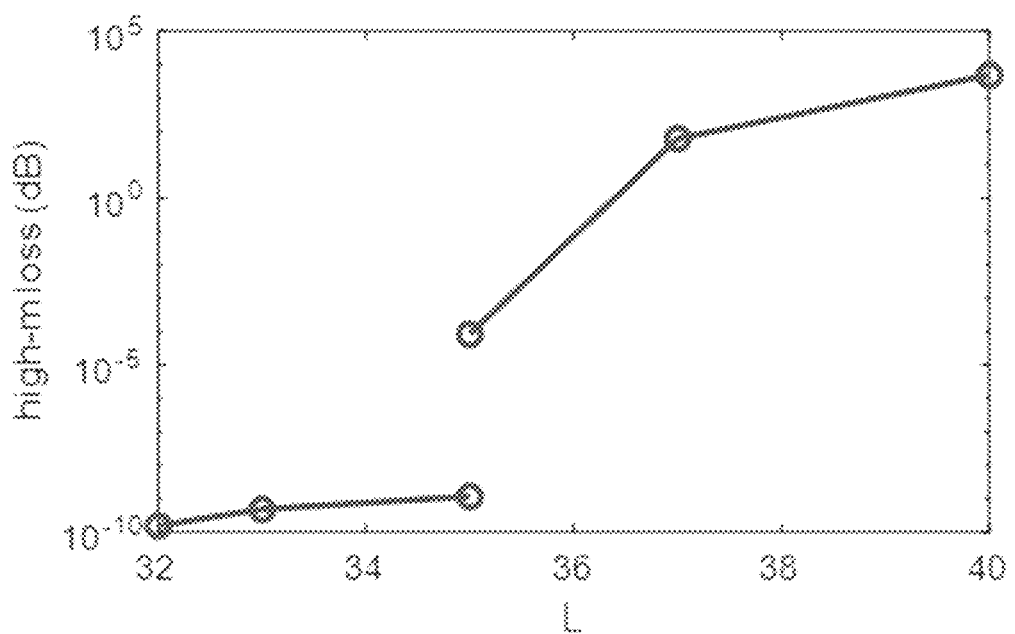
FIG. 11 is a plot of simulated loss of high-m modes which are accidentally degenerate with corresponding m=1 modes of order L at wavelengths around 1550 nm.

FIG. 11 shows the simulated loss of high-m modes which are accidentally degenerate with corresponding m=1 modes with OAM order L around 1550 nm within a 40-nm band. In the range from L=32 to L=40, the modes accidentally degenerate with high-m modes are L=33, 35, 37 and 40. The two separate datapoints for L=35 correspond to two separate points of high-m modes crossing with the SOaa (higher loss) and SOa (lower loss) modes, respectively. Since the effective index between them slightly differ, the mode-coupling crossing wavelengths also differ. Around the wavelength at which accidental degeneracy occurs, the loss of the corresponding high-m mode (L=19, m=4) also starts to rise rapidly. The effective index curve of the L=35 SOaa mode crosses that of the high-m modes at a slightly longer wavelength (where the high-m mode has higher loss) compared with the corresponding crossing wavelength for the L=35 SOa mode.

Experimentally, L=33 SOa and L=35 SOa mix with high-m modes, with image distortion and extra loss; L=35 SOaa and L=37 SOa mix with high-m modes with extra loss and no image distortion. L=40 shows neither extra loss nor image distortion.

From these experiments, we surmise that the loss threshold of high-m modes past which mode coupling with a desired high-L but m=1 mode is substantially suppressed such that no image distortion is evident at the output of the fiber, is $8 \times 10e^{-5}$ dB/m (corresponding to the loss of the high-m mode that crossed with the L=35, m=1 SOaa mode in the experiments described above). As the extra loss is very low and almost negligible in a short length of fiber (10s of meters), it is effectively the point where the desired m=1 mode avoids mode coupling with undesired high-m modes in short-haul applications. The loss threshold of high-m modes is $5 \times 10e^{3}$ dB/m (corresponding to the loss of the high-m mode that crossed with L=40, m=1 mode in the experiments described above) when mode coupling is suppressed so significantly that the desired m=1 mode neither suffers from image distortion nor does it experience extra loss. This regime of operation may be important for applications requiring longer lengths of fiber (>1 km).

Figure 12:
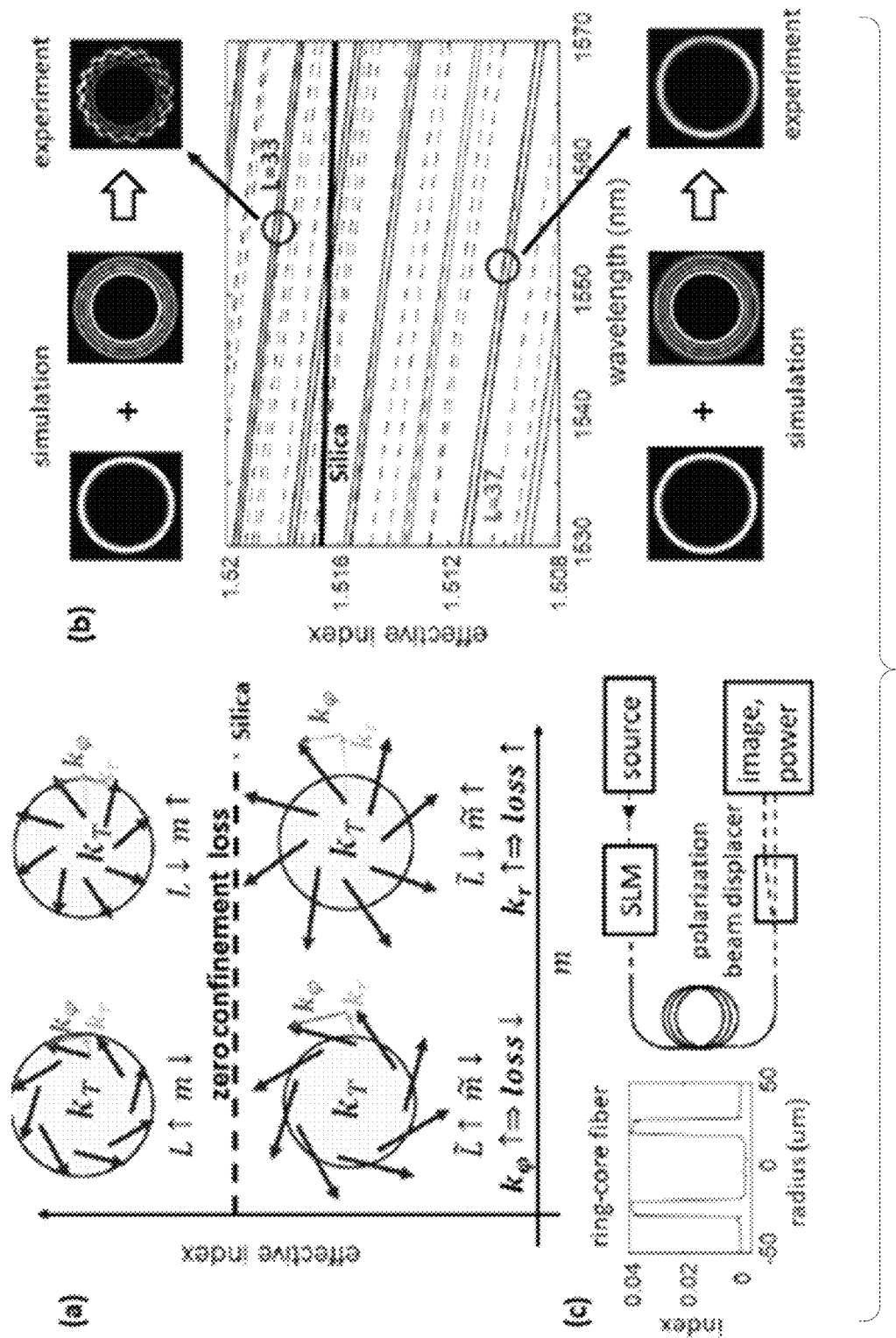
FIG. 12 is a plot of transverse wavevector distribution for bound and cutoff modes; a plot of $n_{eff}$ vs. λ for select modes; and an experimental setup.

FIG. 12 is used to describe an exemplary application of this frustrated coupling phenomenon, employing 25-m long fiber propagating >52 modes with purity >19 dB.

FIG. 12 part (a) shows a plot of the transverse wavevector distribution for bound & cutoff modes—high m modes more lossy; part (b) shows $n_{eff}$ vs. λ for select modes—mode crossings perturb bound OAM modes but TCMs remain stable; part (c) shows the experimental setup and fiber profile. In part (b) the slopes of the higher-L, lower-m modes are slightly different from the slopes of the lower-L, higher-m degenerate modes. The mode crossings are where these neff vs. wavelength lines cross.

As discussed above, FIG. 9B shows $n_{eff}$ vs. λ for select modes in the C-band of a ring-core fiber. The bold lines pairs represent desired OAM modes, while the thin black dashed lines are the undesired high-m modes. The $n_{eff}$ of desired OAM modes cross a lot of undesired high-m modes, potentially leading to strong mode mixing. A desired bound L=33 OAM mode is accidentally degenerate with an undesired bound high-m mode (L=16, m=4) around 1550 nm, leading to the experimental observation of strong image distortion. In contrast, even though the cutoff L=37 TCM crossed, in $n_{eff}$, with another high-m mode (L=22, m=4) around 1550 nm, the experimental mode image shows a clear ring shape in the entire C-band. Here, mode mixing is suppressed because the high-m mode has very high loss, frustrating the process of coherent coupling. Hence, instabilities due to mode crossings, which in the past have plagued the ability to scale bound mode count, can be fundamentally solved by the use of cutoff TCMs and the phenomenon of frustrated coupling.

The principle is tested by using an external cavity laser (ECL) or a pulsed ps laser in the C-band to excite desired OAM modes (L: ±25 to ±45; m=1; LCP/RCP) in a 25-meter ring-core fiber with a spatial light modulator (SLM), and by analyzing the power as well as mode images after separating the output into LCP and RCP bins (see FIG. 12 part (c) for setup and fiber profile). Power measurements conducted with the ps laser yield loss, and mode images, obtained with the ECL, are analyzed using spatial interferometry to deduce full modal content at 1550 nm.

Figure 13:
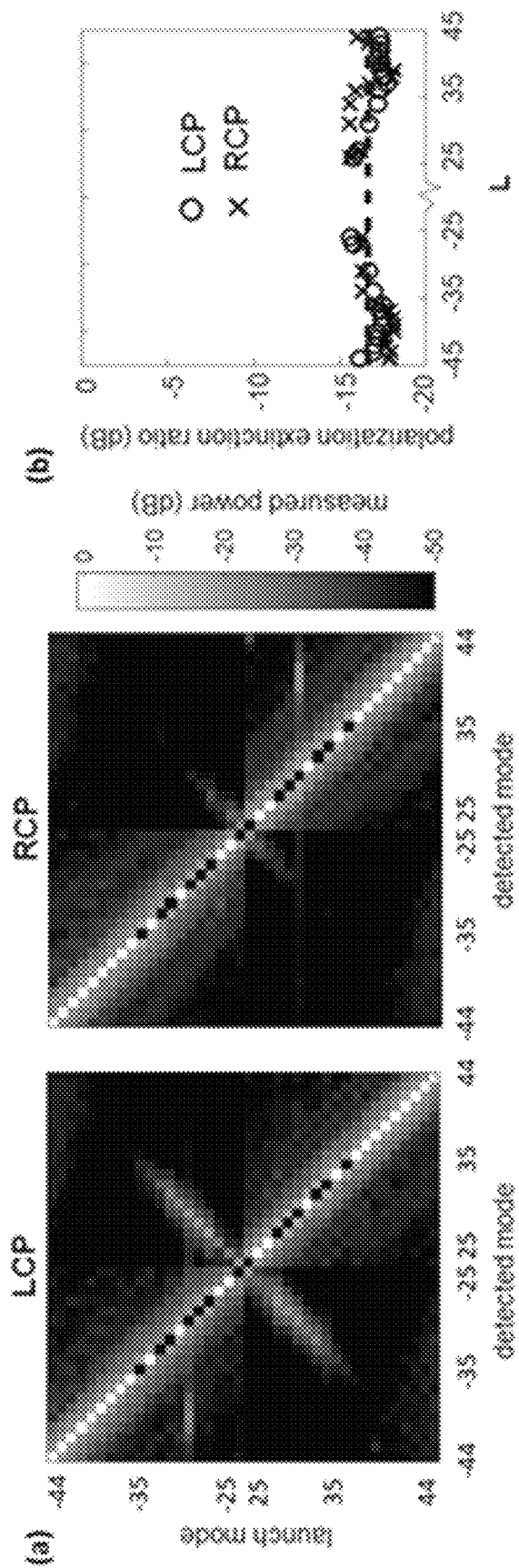
FIG. 13 shows a transfer matrix of modes in one experiment (LCP and RCP) along with polarization extinction ratio of available modes.

FIG. 13 part (a) shows the transfer matrix of all the excited RCP and LCP OAM modes, respectively. Each desired mode illustrated as a white square data point on the inverted diagonals has purity exceeding 19 dB. The interspersed black data points are OAM modes which show the aforementioned inadvertent mode mixing with high-m modes anywhere within the C-band (ascertained by sweeping the ECL in this spectral range). Indeed, note that these inadvertent mode instabilities happen primarily for low L modes, most of which are conventionally bound, but the high-L TCMs never suffer from this problem. FIG. 13 part (b) shows that the polarization extinction ratios (PER) of all the modes remains below ~16 dB—a known attribute that high L OAM modes preserve polarization even amongst degenerate states. Cutback loss measurements were not resolvable within measurement error for most modes except the |L|=44 (~0.03 dB/m) and |L|=45 (~0.14 dB/m) modes, because, indeed, TCMs are expectedly low loss and the fiber on which cutback was employed was only 25-m long. Avoiding counting the "black" data point modes, and the relatively higher loss |L|=45 modes, we have demonstrated modally pure propagation of a record 52 modes over length scales (25 m) of interest to a variety of applications including, crucially, mode-scalable optical amplification.

4. Fiber Scaling and Mode Count

Figure 14:
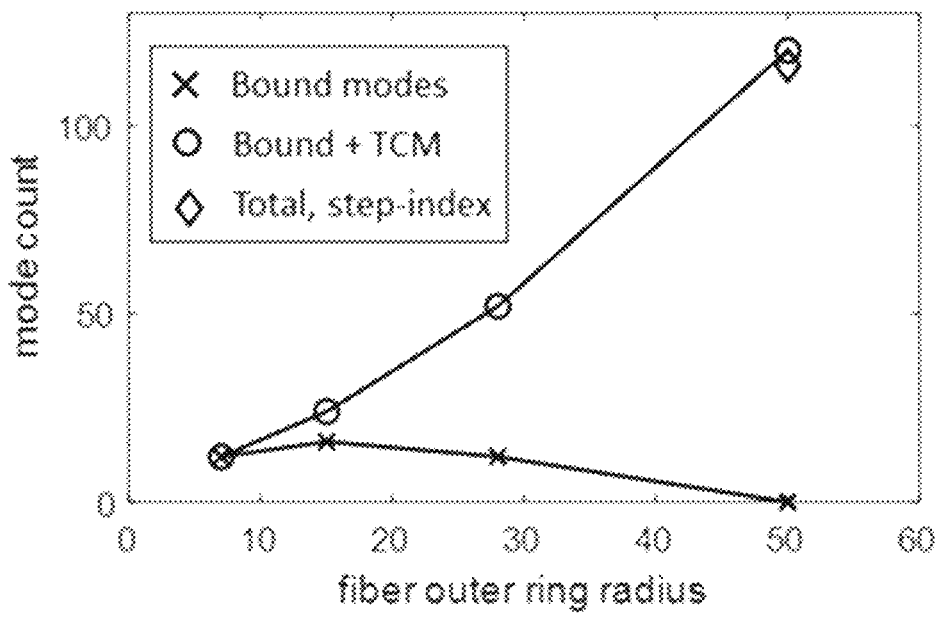
FIG. 14 is a plot of mode count for four different fibers.

FIG. 14 shows the mode count for four different fibers, corresponding to the aforementioned Gen43, Gen5 A3, Gen6 A3, Gen7C. Bound modes are conventionally used previously, and total modes contain both bound modes and TCMs without mode mixing. For Gen43 with outer core radius-7 um, there are no extra low-loss TCMs, and the 12 modes are all of the conventional kind. For Gen5 A3 with outer core radius~15 um, totally 24 modes (including 16 bound modes) were demonstrated at 1550 nm. The lower end is limited by mode mixing (with near-degenerate modes and higher-m modes) and the high end is limited by loss (<0.1 dB/m). For Gen6 A3 with outer core radius-28 um, totally 52 modes (including 12 bound modes) were demonstrated in a 25-m segment of fiber in the C-band spectral range. Again, the lower end is limited by mode mixing (mainly with higher-m modes) and the high end is limited by loss (<0.1 dB/m). The mode count of Gen7C is predicted based on the criteria obtained from Gen6 A3, and it turns out that there aren't any bound modes available (because of conventional near-degeneracies) but the mode count of TCMs is expected to reach ~120. This clearly illustrates the scalability of mode count feasible by exploiting the TCM phenomenon. Similar additional advancements using the disclosed concept, in designing fibers with even higher mode counts, will be evident to those skilled in the art.

Figure 15:
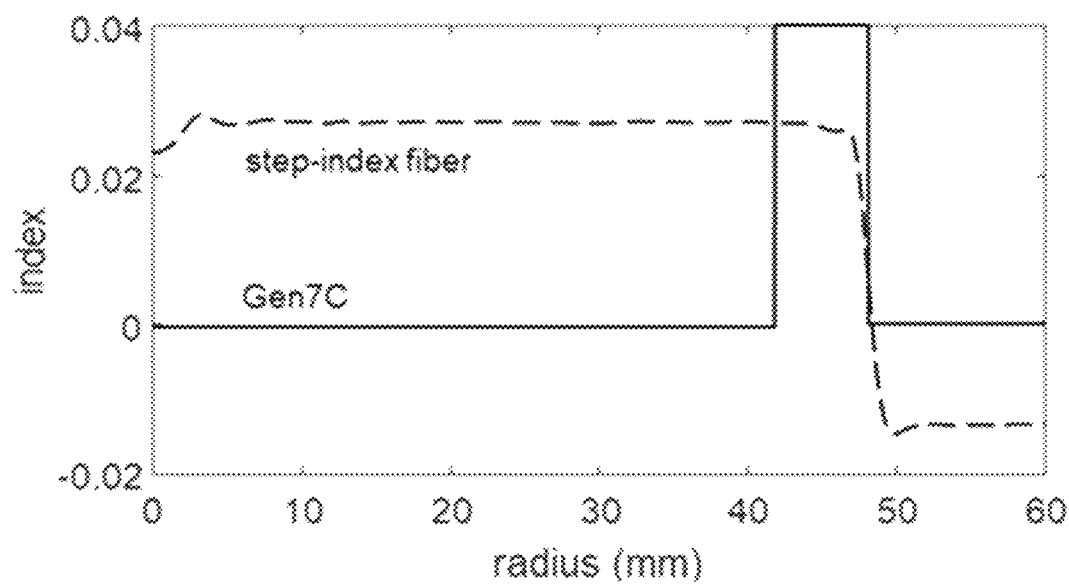
FIG. 15 is a schematic of an index profile of a ring-core fiber and a step-index fiber with similar outer radius.

FIG. 15 illustrates the possibility of using a larger step-index fiber in place of a ring-core fiber. Because of the effect of frustrated coupling, high-L TCMs with m=1 would not mix with other high-m modes even if they are accidentally degenerate with each other in terms of effective index. Therefore, it may be possible to dispense with using a ring core, which is generally used to avoid high-m coupling by reducing the number of guided high-m modes. This mode coupling avoidance now happens by virtue of frustrated coupling instead. FIG. 13 shows the expected total mode count for a step-index fiber having the profile shown in FIG. 15 with similar size as Gen7C. This makes the TCM and frustrated coupling concept very useful for increasing the channel count even for the current fiber infrastructure, since most currently deployed fiber is of the step-index variety.

5. Application for Highly Energetic Soliton

Topological confinement provides the ability to have many modes with very high L. Because dispersion scales with mode order L, it also can provide an alternative way to achieve very high dispersion, which is currently very hard to realize, requiring exotic photonic crystal fiber designs with complicated design and high loss. In addition, as all m=1 modes have similar field profiles, their effective areas remain large even as mode order L is increased. This potentially paves the way dramatically scaling the power that can be transmitted through such fibers.

The energy of a soliton pulse that is transmitted through a fiber can be written as $$E = \frac{\lambda^3 N^2 D A_{eff}}{2\pi^2 c n_2 T_0}$$

where λ is wavelength (around 1 um in the following cases), N is the soliton number (usually set as one), D is dispersion, $A_{eff}$ is effective area, $n_2$ is the nonlinear refractive index of the material, and $T_0$ is duration of the pulse. From the above equation, it is evident that soliton energy scales as $DA_{eff}$.

Figure 16:
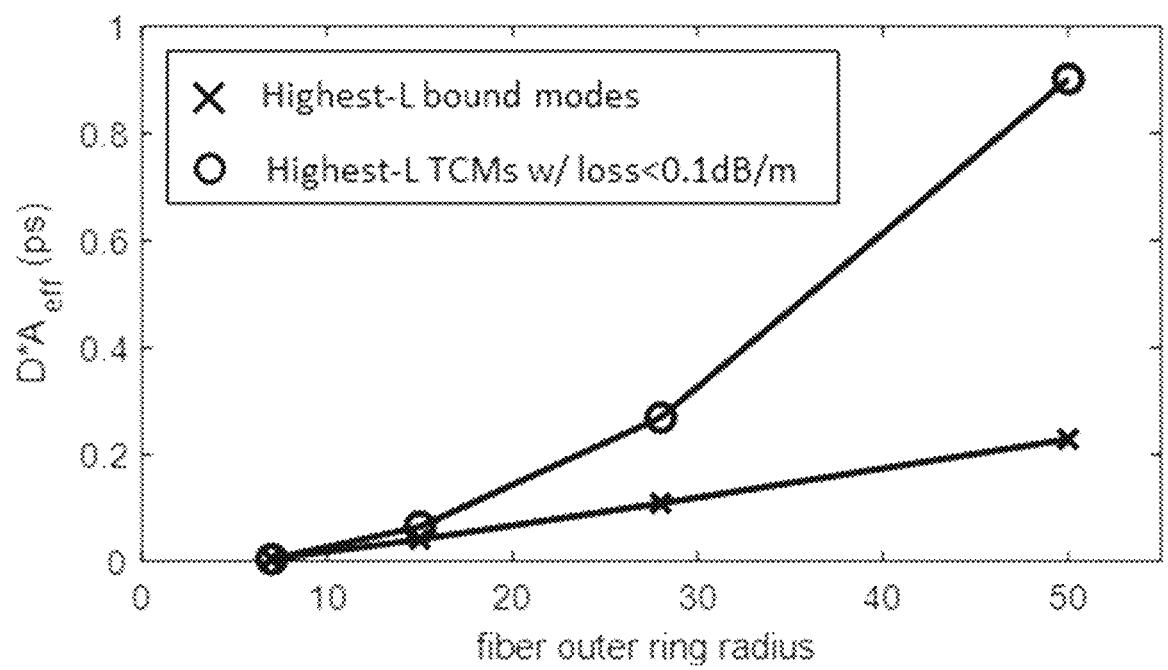
FIG. 16 is a plot of $DA_{eff}$ for four different fiber with different sizes.

FIG. 16 shows a plot of $DA_{eff}$ for four different fibers with different sizes, corresponding to the aforementioned Gen43, Gen5 A3, Gen6 A3, Gen7C. The cross marker corresponds to highest-L bound modes (conventional modes), and the circle marker corresponds to highest-L TCMs with negligible loss <0.1 dB/m. For example, in the designed Gen7C fiber with outer core radius~50 um, the conventional cutoff mode is L=89 with dispersion ~190 ps/nm-km, while the TCM can go up to L=181 (with negligible loss<0.1 dB/m) with dispersion ~1070 ps/nm-km, leading to very large values of $DA_{eff}$. Thus, energy of the soliton supported by the highest allowed TCM is almost five time larger than that supported by conventional bound modes. Such energetic solitons with short pulse duration can be useful for a variety of applications, e.g., machining, fusion, electron acceleration, particle acceleration and deep-imaging multi-photon microscopy.

Figure 17:
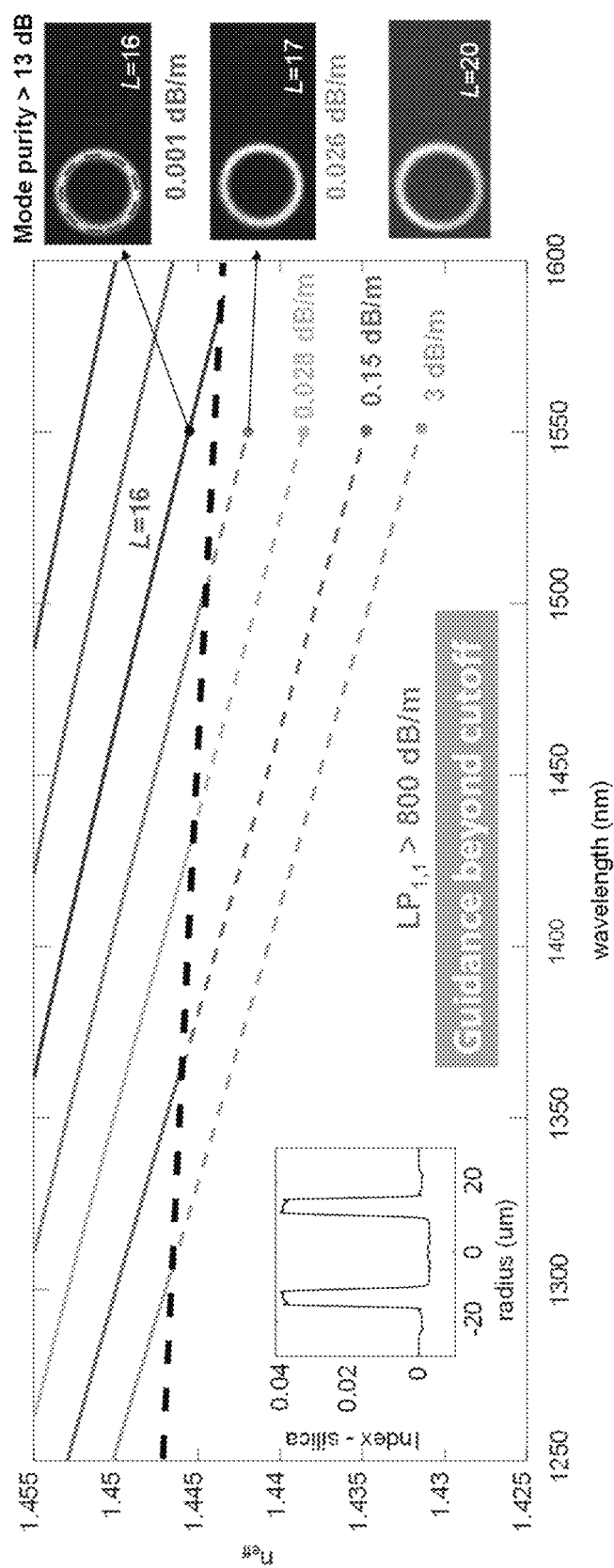
FIG. 17 is plot of $n_{eff}$ versus wavelength showing attenuation values for various higher-L modes at 1550 nm wavelength.
Figure 18:
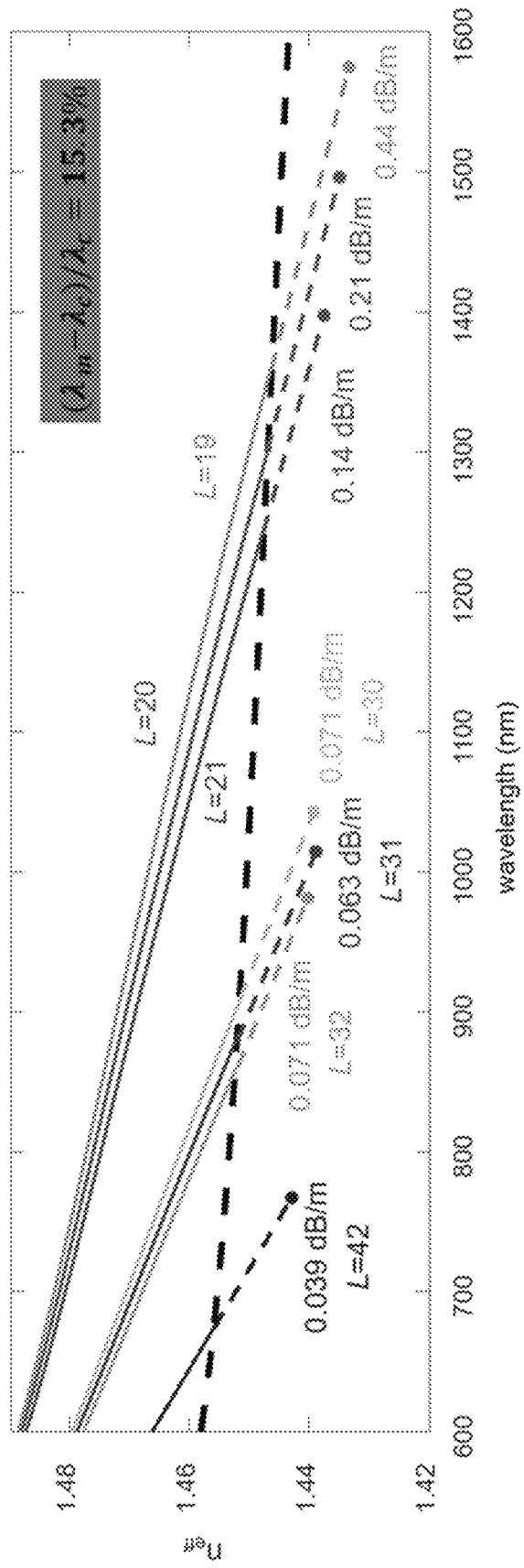
FIG. 18 is a plot of $n_{eff}$ versus wavelength showing attenuation at 15% past cutoff for various higher-L modes.
Figure 19:
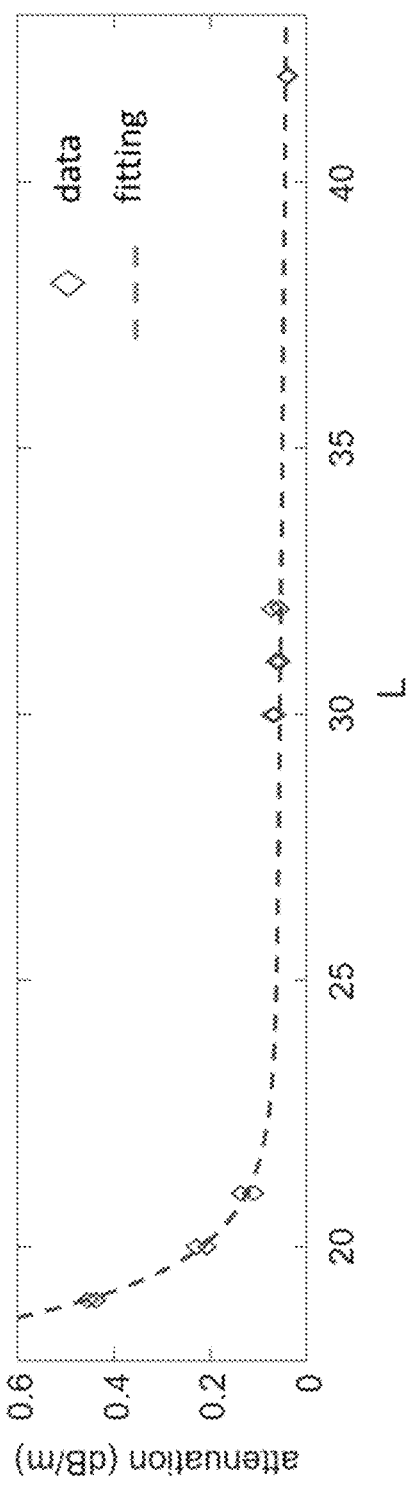
FIG. 19 is a plot of attenuation versus L-mode for the data of FIG. 18.

FIGS. 17-19 are plots further illustrating the nature of TCMs. FIG. 17 is a plot of $n_{eff}$ versus wavelength for modes L=16 to L=20, showing loss/attenuation values in a range from 0.001 dB/m to 3 dB/m at 1550 nm wavelength, in a fiber for which the LP1,1 mode experiences loss >800 dB/m at the same wavelength. The higher-L modes are guided even though they are beyond cutoff. FIG. 18 shows a plot of neff versus wavelength for selected modes from L=19 to L=42, each having a respective loss value being a fraction of 1 dB/m at 15% past its respective cutoff. FIG. 19 is a plot of attenuation versus L based on the data of FIG. 18, with an extrapolation upward at the smaller-L end of the scale.

Figure 20:
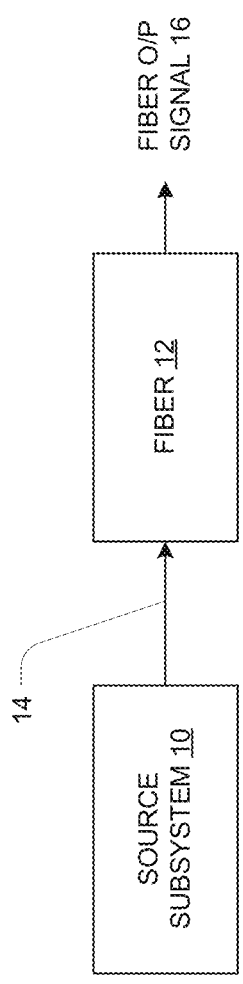
FIG. 20 is a block diagram of an optical fiber system.

FIG. 20 is a block diagram of a general optical fiber system structure that employs TCMs as described herein. The system includes an optical source subsystem 10 coupled to a fiber 12 having a geometry and index profile defining a cutoff wavelength for a predetermined L-mode of optical signal propagation in the optical fiber 12. Examples of such fibers are given above. The optical source subsystem 10 is configured to generate an optical beam 14 at a beam wavelength, supplied to the fiber 12 to excite the predetermined L-mode, wherein the beam wavelength is either (1) at least 15% above the cutoff wavelength such that the optical beam 14 propagates as a topologically confined mode (such as illustrated in FIG. 18 for example), or (2) sufficiently above the cutoff wavelength that, based on the L-mode of the optical beam 14, the optical beam propagates as a topologically confined mode having propagation loss less than 3 dB/meter (such as shown in FIG. 17, for example). The fiber 12 produces a fiber output signal 16 as needed for the specific application, e.g., a laser output, optical device output, telecom signal, etc.

Figure 21:
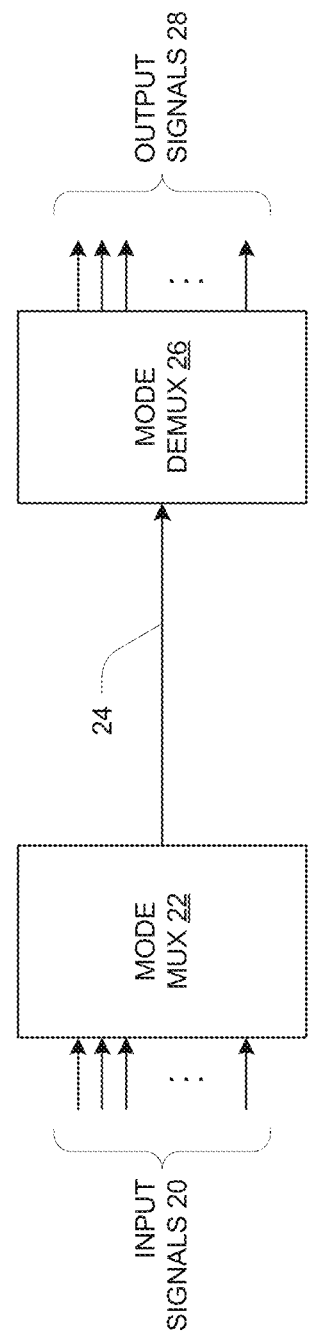
FIG. 21 is a block diagram of an optical fiber system.

FIG. 21 shows a more specific realization of the optical fiber system utilizing a multi-mode capability as described herein to convey multiple communications channels from one location to another. A plurality of optical input signals 20 are provided to a mode multiplexer (mux) 22 which generates a multiplexed optical signal on a fiber 24. At the other end, the optical signal passes through a mode demultiplexer (demux) 26 to generate output signals 28. Generally, the mode multiplexing may be as described above, i.e., a plurality of distinct high-L modes, having the benefit of frustrated coupling to avoid the signal degradation of degenerate mode coupling.

In an optical fiber system as disclosed, in one embodiment a desired TCM or set of TCMs is carried into the fiber by the input optical signal(s), such as from the optical source subsystem 10 or mux 22. More generally the desired TCM or TCMs are in some way induced or excited within the fiber but not necessarily by simply being accepted from an external source. In one type of embodiment, the fiber contains a mode-transformative element that receives a conventional mode (from an input optical signal) and converts it into a desired TCM. In another embodiment, a conventional mode in the fiber undergoes nonlinear transformation into a desired TCM through one or more intermodal nonlinear optical transformations such as are generally known in the art.

While the above description assumes the use of passive fibers, it is well known to those skilled in the art that once certain passive properties of fiber modes are known, these can also be exploited in active fibers. Passive fiber primarily transmits light, and does not provide gain to the light beam, mode or signal. In contrast, an active fiber is typically doped with a laser-gain element such as Ytterbium, Erbium of Thulium, which, when pumped with well-known pumping mechanisms, can yield gain for a mode, and hence also for TCMs, thereby allowing the use of TCMs and frustrated coupling not just in passive fibers and in transmissive functionalities, but also in amplifiers and lasers.

While various embodiments of the invention have been particularly shown and described, it will be understood by those skilled in the art that various changes in form and details may be made therein without departing from the scope of the invention as defined by the appended claims.

What is claimed is:

1. An optical fiber system, comprising:
   an optical fiber having a geometry and index profile providing for propagation of optical signals as topologically confined modes at wavelengths above a cutoff wavelength for a predetermined L-mode of optical signal propagation in the optical fiber, L being azimuthal mode index, the L-mode order having a magnitude |L| greater than or equal to 16, the cutoff wavelength being a wavelength above which the predetermined L-mode is not guided by total internal reflection; and
   an optical source subsystem coupled to the optical fiber to establish an optical signal propagating therein, the optical signal having the predetermined L-mode and a wavelength being either (1) at least 15% above the cutoff wavelength such that the optical beam propagates as a topologically confined mode, or (2) sufficiently above the cutoff wavelength that, based on the L-mode of the optical beam, the optical beam propagates as a topologically confined mode having propagation loss less than 3 dB/meter.

2. The optical fiber system of claim 1, wherein the L-mode is an optical angular momentum (OAM) mode.

3. The optical fiber system of claim 1, wherein the L-mode is linearly polarized (LP) mode.

4. The optical fiber system of claim 1, wherein the L-mode is a hybrid electric-magnetic or magnetic-electric (HE or EH) mode.

5. The optical fiber system of claim 1, wherein the optical signal further includes exhibits an m-mode of optical signal propagation, m being radial mode index, m being less than or equal to three.

6. The optical fiber system of claim 5, wherein m is equal to one.

7. The optical fiber system of claim 1, wherein the optical fiber has a ring index profile with a ring outer radius greater than 15 um.

8. The optical fiber system of claim 1, wherein the optical fiber has a step-index profile with a step radius greater than 15 um.

9. The optical fiber system of claim 1, wherein the optical source subsystem includes a laser source and a spatial light modulator effective to produce the optical signal in the optical fiber.

10. The optical fiber system of claim 1, configured as a fiber laser producing the L-mode optical signal as a laser output signal.

11. The optical fiber system of claim 1, wherein the optical source subsystem producing the L-mode optical signal includes a mode-converting device within the fiber.

12. The optical fiber system of claim 1, wherein the L-mode optical signal is produced by a nonlinear optical mode transformation within the fiber.

13. The optical fiber system of claim 1, wherein the L-mode optical signal is a soliton experiencing mode-dependent dispersion D>200 ps/nm-km and/or mode-dependent $D^*A_{\mathit{eff}}$>0.2 ps.

14. The optical fiber system of claim 1, wherein the optical source subsystem is configured to generate a plurality of optical beams having corresponding (L, m) modes at corresponding beam wavelengths and direct the optical beams into the optical fiber to propagate as topologically confined modes, m being radial mode index, the (L, m) modes have magnitude |L| greater than or equal to 16, wherein the beam wavelengths and L values of the (L, m) modes are selected to result in frustrated coupling between the (L, m) modes and other-m modes, with correspondingly low mode-mixing distortion.

15. The optical fiber system of claim 14, wherein the (L, m) modes are (L, 1) modes having m=1.

16. The optical fiber system of claim 14, wherein the other-m modes have sufficiently higher loss than the (L, m) modes to produce the frustrated coupling.

17. The optical fiber system of claim 16, wherein the other-m modes have loss at least $8 \times 10^{-5}$ dB/m such that modal distortion is avoided.

18. The optical fiber system of claim 16, wherein the other-m modes have loss at least at least $5 \times 10^3$ dB/m such that modal distortion is avoided and loss for the (L, m) modes is avoided.

19. The optical fiber system of claim 1, wherein the L-mode order has magnitude |L| greater than or equal to 30, and the optical beam propagates as a topologically confined mode having an L-dependent loss less than a material transmission loss in a standard single-mode fiber.

20. The optical fiber system of claim 19, wherein the L-dependent loss is less than 0.15 dB/km.

21. The optical fiber system of claim 19, wherein the fiber has a length of 1 Km or greater.

22. The optical fiber system of claim 1, wherein the optical signal further includes exhibits an m-mode of optical signal propagation, m being radial mode index, m being less than or equal to three.

23. The optical fiber system of claim 22, wherein m is equal to one.

* * * * *